United States Patent [19]

Brunelle

[11] 4,329,443
[45] May 11, 1982

[54] PROCESS FOR POLYESTER-CARBONATE TRANSESTERIFICATIONS

[75] Inventor: Daniel J. Brunelle, Scotia, N.Y.

[73] Assignee: General Electric Company, Schenectady, N.Y.

[21] Appl. No.: 143,804

[22] Filed: Apr. 23, 1980

[51] Int. Cl.³ .............................................. C08G 63/64
[52] U.S. Cl. ..................................... 528/180; 528/191
[58] Field of Search ................................. 528/180, 191

[56] References Cited

U.S. PATENT DOCUMENTS 3,409,704 11/1968 Bailey .................................. 528/202

Primary Examiner—Maurice J. Welsh
Attorney, Agent, or Firm—Joseph T. Cohen; James C. Davis, Jr.

[57] ABSTRACT

A polyester-carbonate transesterification process comprising reacting a bis(ortho-haloaryl)ester, a bis(ortho-haloaryl)carbonate, and a dihydric phenol under transesterification reaction conditions.

7 Claims, No Drawings

PROCESS FOR POLYESTER-CARBONATE TRANSESTERIFICATIONS

CROSS REFERENCE TO RELATED APPLICATIONS

This invention is related to U.S. patent applications Ser. No. 106,855 and Ser. No. 106,856, both filed Dec. 26, 1979 and now both abandoned; Ser. No. 134,349 and Ser. No. 134,705, both filed on Mar. 27, 1980, all the aforesaid patent applications being in the name of Daniel Joseph Brunelle; and Ser. No. 970,058 filed Dec. 15, 1978 in the names of Daniel Joseph Brunelle and William Edward Smith, now issued as U.S. Pat. No. 4,217,438 on Aug. 12, 1980. The above applications are assigned to the assignee of this invention and all of their disclosures are incorporated herein in their entirety by reference.

BACKGROUND OF THE INVENTION

1. Field of the Invention

This invention relates to a polyester-carbonate transesterification process comprising reacting a bis(ortho-haloaryl)ester, bis(ortho-haloaryl)carbonate and a dihydric phenol under transesterification reaction conditions.

2. Description of the Prior Art

In general, polyester-carbonate transesterification prior art—includes The Encyclopedia of Polymer Science, Vols. 9 and 10 (1969), Chemistry and Physics of Polycarbonates Polymer Reviews, H. Schnell, Vol. 9, John Wiley and Sons, Inc. (1964); "Polycarbonates", Christopher and Fox, Reinhold Corporation of New York (1962); among other publications, e.g., Polyarylates (polyesters from aromatic dicarboxylic acids and bisphenols) by G. Bier, Polymer, Vol. 15, pages 527–535 (August 1974) indicate that generally effective transesterification reactions involving aromatic dihydroxy compounds, diesters of aromatic dicarboxylic acids, and carbonic acid aromatic diesters can be carried out via melt condensation reactions in the formation of various thermoplastic polyester-carbonate compositions.

DESCRIPTION OF THE INVENTION

This invention embodies a polyester-carbonate transesterification process comprising reacting a bis(ortho-haloaryl)ester, a bis(ortho-haloaryl)carbonate and a dihydric phenol under transesterification reaction conditions.

The "bis(ortho-haloaryl)ester" is defined by the general formula:

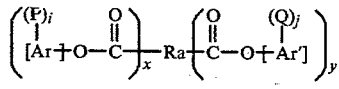

where Ra represents an aromatic ring, both x and y individually represent whole numbers of at least 1 up to the maximum equivalent to the number of replaceable hydrogen atoms or other groups, e.g. $C_{1-4}$ alkyl, substituted for on an aromatic ring comprising Ra, where independently at least a P or Q substituent is an ortho-positioned halogen, e.g. Cl, F, Br, or I, or a trifluoromethyl group, e.g. —$CF_3$, directly bonded to an aromatic ring carbon atom located adjacent to an oxy group of an ester group, at least one of i or j represent a whole number of at least 1 up to a maximum equivalent to the number of replaceable hydrogen atoms or other groups, e.g. $C_{1-4}$ alkyl, substituted for on aromatic rings comprising Ar and Ar'.

Presently preferred bis(orthoaryl)esters, including mixtures thereof, are of the formula:

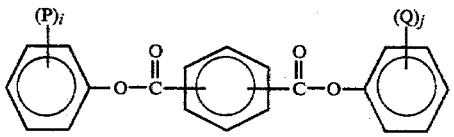

where P, Q, i and j are as defined above. Specific examples follow:
bis(o-chlorophenyl)isophthalate,
bis(o-chlorophenyl)terephthalate,
bis(o-trifluoromethylphenyl)isophthalate,
bis(o-trifluoromethylphenyl)terephthalate,
bis(2-chloro-4-methylphenyl)isophthalate,
bis(2-chloro-4-methylphenyl)terephthalate,
o-iodophenyl o-trifluoromethylphenyl isophthalate,
o-iodophenyl o-trifluoromethylphenyl terephthalate,
bis(o-fluorophenyl)isophthalate,
bis(o-fluorophenyl)terephthalate,
bis(2-chloro-3-methylphenyl)isophthalate,
bis(2-chloro-3-methylphenyl)terephthalate,
bis(2-bromo-4-ethylphenyl)isophthalate,
bis(2-bromo-4-ethylphenyl)terephthalate,
bis(2-chloro-5-propylphenyl)isophthalate,
bis(2-chloro-5-propylphenyl)terephthalate,
bis(2-iodo-6-butylphenyl)isophthalate,
bis(2-iodo-6-butylphenyl)terephthalate,
o-chlorophenyl phenylisophthalate,
o-chlorophenyl phenylterephthalate,
o-trifluoromethylphenyl phenylisophthalate,
o-trifluoromethylphenyl phenylterephthalate,
o-chloro-p-methylphenyl phenylisophthalate,
o-chloro-p-methylphenyl phenylterephthalate,
o-trifluoromethylphenyl phenylisophthalate, and
o-trifluoromethylphenyl phenylterephthalate, etc.

The "bis(ortho-haloaryl)carbonate" also commonly referred to as a carbonic acid aromatic diester of an orthohalophenol is defined herein by the general formula:

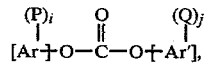

where P, Q, i, j, Ar and Ar' are as defined above. Specific examples of presently preferred, including mixtures thereof, bis(ortho-haloaryl)carbonates follow:
bis(o-chlorophenyl)carbonate
bis(o-trifluoromethylphenyl)carbonate
bis(2-chloro-4-methylphenyl)carbonate
o-iodophenyl o-trifluoromethylphenyl carbonate
bis(o-fluorophenyl)carbonate
bis(2-chloro-3-methylphenyl)carbonate,
bis(2-bromo-4-ethylphenyl)carbonate,
bis(2-chloro-5-propylphenyl)carbonate,
bis(2-iodo-6-butylphenyl)carbonate,
o-chlorophenyl phenylcarbonate,
o-trifluoromethylphenyl phenylcarbonate,
o-chloro-p-methylphenyl phenylcarbonate, and
o-trifluoromethylphenyl phenylcarbonate, etc.

Sterically hindered ortho-haloaryl esters or carbonates having P and Q substituents positioned on all available ortho locations of the same aromatic ring are excluded as reactants.

Any of the dihydric phenols, bases, as well as reaction parameters relative to amounts of reactants, etc., as well as reaction time, temperature and pressure described in previously mentioned U.S. Pat. No. 4,217,438 Ser. No. 970,058 of D. J. Brunelle and W. E. Smith can be employed in the process of this invention. Accordingly, for brevity their descriptions are incorporated herein in their entirety by reference.

Illustratively, "dihydric phenols" include dihydric or dihydroxy aromatic compounds—also incorporated herein by reference—defined by Fox's Formula II in U.S. Pat. No. 3,153,008, column 2, lines 23–72 and column 3, lines 1–42. Presently preferred dihydric phenols are of the formulas:

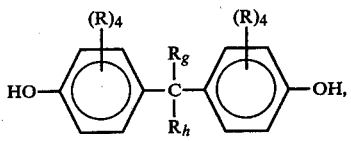

where independently each R is hydrogen, $C_{1-4}$ alkyl, methoxy, bromine and chlorine, $R_g$ and $R_h$ are hydrogen or a $C_{1-30}$ monovalent hydrocarbon or hydrocarbonoxy group, and

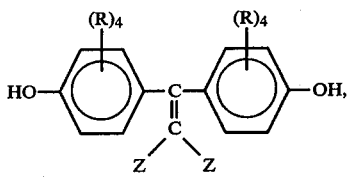

where independently each R is as defined above and each Z is hydrogen, chlorine or bromine, subject to the proviso that at least one Z is chlorine or bromine.

Specific examples follow:
4,4′-dihydroxy-diphenyl-1,1-butane,
4,4′-dihydroxy-diphenyl-2-chlorophenyl methane,
4,4′-dihydroxy-diphenyl-2,2-propane also known as "BPA" or bis(4-hydroxyphenyl)propane-2,2,
4,4′-dihydroxy-3-methoxy-diphenyl-2,2-propane,
4,4′-dihydroxy-3-isopropyl-diphenyl-2,2-propane,
4,4′-dihydroxy-diphenyl-2,2-nonane,
4,4′-dihydroxy-2,2′,3,3′,5,5′,6,6′-octamethyl-diphenyl methane,
4,4′-dihydroxy-2,2′-dimethyl-5,5′-di-tert.-butyldiphenyl methane,
4,4′-dihydroxy-3,3′,5,5′-tetrachloro-diphenyl-2,2-propane,
4,4′-dihydroxy-3,3′,5,5′-tetrabromo-diphenyl-2,2-propane, also referred to as "TBBPA" or bis(3,5-dibromo-4-hydroxyphenyl)propane-2,2,
1,1-dichloro-2,2-bis(4-hydroxyphenyl)ethylene also referred to as bisphenol-E "BPE" or bis(4-hydroxyphenyl)-2,2-dichloroethylene,
1,1-dibromo-2,2-bis(4-hydroxyphenyl)ethylene,
1,1-dichloro-2,2-bis(5-methyl-4-hydroxyphenyl)ethylene,
1,1-dibromo-2,2-bis(3,6-n-butyl-4-hydroxyphenyl)ethylene,
1,1-dichloro-2,2-bis(2-chloro-5-ethyl-4-hydroxyphenyl)ethylene,
1-bromo-2,2-bis(4-hydroxyphenyl)ethylene,
1,1-dichloro-2,2-bis(2-ethoxy-4-hydroxyphenyl)ethylene, and
1-bromo-2,2-bis(3,5-diphenylether-4-hydroxyphenyl)ethylene.

Illustrative specific examples of inorganic or organic bases that can be employed follow: sodium metal, lithium hydroxide, sodium carbonate, sodium acetate, sodium methylate, sodium tetrasulfide, sodium borohydride, isopropylamine, propanediamine, pyridine, 1,2,2,6,6-pentamethylpiperidine, sodium benzoate, sodium phenoxide, sodium salts of bisphenol-A, etc.

Presently preferred bases are certain "metal hydride" catalysts—described in greater detail in Ser. No. 106,856 and Ser. No. 106,855 previously referred to—and include any compound which contains aluminumhydride or boronhydride counterions, for example alkali metal, alkaline earth metal, quaternary ammonium quaternary phosphonium, or tertiary sulfonium aluminumhydrides or boronhydrides.

An especially preferred metal hydride is the product obtained by forming a homogeneous solution or melt of a metal hydride containing aluminumhydride or boronhydride counterions with a bis(ortho-haloaryl)ester, a bis(ortho-haloaryl)carbonate or dihydric phenol, subsequently separating any solvent—if used, cooling, and recovering a homogeneous solid pre-formed mixture of metal hydride and bis(ortho-haloaryl)ester and/or bis(ortho-haloaryl)carbonate and/or phenol, more preferably a bis(ortho-haloaryl)carbonate.

Any amount of base can be employed. In general, effective mole ratios of base, e.g. LiOH, LiAlH$_4$, Me$_4$NBH$_4$, etc., to dihydric phenols are within the range of from about $1 \times 10^{-8}$ to 1 or even lower to about 1 to 1, or even higher, preferably from $1 \times 10^{-6}$ to 1 to about $2 \times 10^{-3}$ to 1, and more preferably from $1 \times 10^{-5}$ to 1 to $1 \times 10^{-3}$ to 1. Generally, mole ratios of at least $1 \times 10^{-5}$ to 1 enhances both the reaction rate and the yield of polycarbonate.

Any reaction pressure can be employed, e.g. atmosphere, subatmosphere or superatmospheric. Generally, however, the process is preferably carried out under a reaction pressure of approximately 1 atm. (~760 mm. Hg.) during the initial phase of the reaction with a subsequent pressure reduction to values in the order of 0.1 to 1.0 Hg. (vacuum), or even lower.

Any reaction temperature can be employed. Optimum reaction temperatures are generally within the range of from 80° C. or even lower, to 300° C. or even higher, and more often 120° C. to 260° C.

Any reaction time can be employed. Generally, optimum reaction time periods are from about 0.5 hours or even less to about 24 hours or even more.

BEST MODE

EXAMPLES I AND II (A) FIRST STAGE TRANSESTERIFICATION:
11.414 g. of bis(4-hydroxyphenyl)propane-2,2 (50.0 mmol.), 1.413 g. of bis(o-chlorophenyl)carbonate (5.00 mmol.), and 17.426 g. of bis(o-chlorophenyl)isophthalate (45.0 mmol.) were blanketed under a nitrogen atmosphere and preheated for 15 minutes to a temperature of about 110° C. The resulting mixture was then charged with $2 \times 10^{-3}$ mole % of LiOH (0.001 mmol.) added in the form of a 0.1 N LiOH aqueous solution. After the catalyst addition, the temperature and pressure reaction conditions were adjusted sequentially accordingly: 110° C. to 210° C. at atmospheric pressure over 15 minutes, 210° C. at 100 mm. Hg (vacuum) over the next 15 minutes, 210° C. at 10 mm. Hg (vacuum) over the next 15 minutes, and finally 240° C. at 10 mm. for 5 minutes—while continuously maintaining the reaction mixture under $N_2$ atmosphere while removing by-product o-chlorophenol via distillation. A control-contrast reaction was carried out under identical reaction conditions substituting 1.071 g. of diphenylcarbonate for bis(o-chlorophenyl)carbonate and 14.325 g. of diphenyl isophthalate for bis(o-chlorophenyl)isophthalate.

(B) SECOND STAGE TRANSESTERIFICATION:

The resulting first stage reaction polyester polycarbonate product was subsequently heated to 285° C. at 0.10 mm. Hg over a 30 minute period.

A summary of the process time-temperature-pressure sequence and the properties of the resulting polyester-polycarbonates is set out in Tables I and II, respectively.

TABLE II

| Example No. | Stage | Primary Ester-Carbonate Starting Materials (mol. %) | | IPA-BPA Polyester-Carbonate | | |
|---|---|---|---|---|---|---|
| | | | | Color | $MW_w{}^2$ | $I.V.^3$ |
| I | First | bis(o-chlorophenyl)isophthalate | (90) | light yellow | 5,200 | 0.150 |
| | | bis(o-chlorophenyl)carbonate | (10) | | | |
| I | Second | IPA-BPA polyester-carbonate ($MW_w$-5200) | | light yellow | 40,300 | 0.456 |
| II | First | diphenyl isophthalate | (90) | yellow | ~800$^4$ | 0.037 |
| | | diphenyl carbonate | (10) | | | |
| II | Second | IPA-BPA polyester-carbonate ~($MW_w$-800) | | orange | ~5,800$^4$ | 0.165 |

FOOTNOTES:
$^2$ = GPC wt. avg. MW, rel. to polystyrene
$^3$ = IV measured in tetrachloroethane at 25° C.
$^4$ = approximate (~) values estimated based on I.V.

EXAMPLES III AND IV 11,414 g. of bis(4-hydroxyphenyl)propane-2,2 (50.0 mmol.) and 7.075 g. of bis(o-chlorophenyl)carbonate (25.0 mmol.), and 9.678 g. of bis(o-chlorophenyl)isophthalate (25.0 mmol.) were blanketed under a nitrogen atmosphere and reacted in accord with the process-temperature-pressure sequence of Examples I and II.

A summary of the properties of the resulting polyesterpolycarbonates is set out in Table III.

TABLE III

| Example No. | Stage | Primary Ester-Carbonate Starting Materials (mol. %) | | IPA-BPA Polyester-Carbonate | | |
|---|---|---|---|---|---|---|
| | | | | Color | $MW_w{}^2$ | $I.V.^3$ |
| III | First | bis(o-chlorophenyl)isophthalate | (50) | colorless | 6,800 | 0.198 |
| | | bis(o-chlorophenyl)carbonate | (50) | | | |
| III | Second | IPA-BPA polyester-carbonate ($MW_w$-6800) | | colorless | 40,900 | 0.463$^5$ |
| IV | First | diphenyl isophthalate | (50) | pale yellow | 700 | 0.031 |
| | | diphenyl carbonate | (50) | | | |
| IV | Second | IPA-BPA polyester-carbonate ($MW_w$700) | | yellow | ~3,000$^4$ | .115 |

FOOTNOTES:
$^{2,3,4}$ = same as previous examples
$^5$ = IV measured in $CHCl_3$ at 25° C.

TABLE I

Summary of First and Second Stage Reaction Parameters

| Process Sequence | Cumulative Reaction Time/hr. | Time Individual Interval/hr. | Temp. °C. | Pressure Hg |
|---|---|---|---|---|
| First Stage | 0.25 | 0.25 | r.t.-210 | $N_2$ atm./760 mm. |
| | 0.50 | 0.25 | 210 | $N_2$ atm./100 mm. |
| | 0.75 | 0.25 | 210 | $N_2$ atm./10 mm. |
| | 0.83 | 0.08 | 240 | $N_2$ atm./10 mm. |
| Sub-total | 0.83 | N.A.$^1$ | r.t.-240 | $N_2$ atm./760-10 mm |
| Second Stage | 0.5 | 0.5 | 285 | $N_2$ atm./0.1 mm. |
| Summary | 1.33 | N.A. | 285 | $N_2$ atm./760-0.1 mm |

FOOTNOTES:
$^1$N.A. = not applicable

EXAMPLES V AND VI 11,414 g. of bis(4-hydroxyphenyl)propane-2,2 (50.0 mmol.) and 0.7075 g. of bis(o-chlorophenyl)carbonate (2.5 mmol.), and 18.388 g. bis(o-chlorophenyl)isophthalate (47.5 mmol.) were blanketed under a nitrogen atmosphere and reacted in accord with the process-temperature-pressure sequence of Examples I and II.

A summary of the properties of the resulting polyesterpolycarbonates is set out in Table IV.

TABLE IV

| Example No. | Stage | Primary Ester-Carbonate Starting Materials (mol. %) | | IPA-BPA Polyester Carbonate | | |
|---|---|---|---|---|---|---|
| | | | | Color | $MW_w$[2] | I.V.[3] |
| V | First | bis(o-chlorophenyl)isophthalate<br>bis(o-chlorophenyl)carbonate | (95)<br>(5) | light yellow | 5,700 | 0.167 |
| V | Second | IPA-BPA polyester-carbonate ($MW_w$-5700) | | light yellow | 41,900 | 0.595 |
| VI | First | diphenyl isophthalate<br>diphenyl carbonate | (95)<br>(5) | dark yellow | 300 | 0.034 |
| VI | Second | IPA-BPA polyester-carbonate ($MW_w$-300) | | orange | ~2,800 | 0.105 |

FOOTNOTES:
[2,3] = same as previous examples

In general, the combined use of bis(ortho-haloaryl)esters and bis(ortho-haloaryl)carbonates in the polyester-carbonate transesterification process of this patent provides advantages not associated with other ester-carbonate transesterification substrates, such as diphenylisophthalate and/or diphenylcarbonate. The combined use of bis(ortho-haloaryl)ester and bis(ortho-haloaryl)carbonate substrates provides—when contrasted with diphenylcarbonate—the following advantages:

(1) improved transesterification reaction rate, (2) less polyester-carbonate color formation during the transesterification reaction, (3) milder transesterification reaction conditions including lower temperatures, (4) reduced amounts of ester and/or carbonate substrate since only stoichiometric amounts or amounts slightly in excess, e.g. 0 to 1%, based on dihydric phenol are required for complete conversion of all dihydric phenol to polyester-carbonate, and (5) reduced quantities of catalyst at improved reaction rate, temperature and pressure transesterification reaction conditions. The use of estercarbonate substrate mixtures containing haloaryl arylester and/or carbonate substrates provides in addition to the above advantages controlled aryl end-capping of the resulting polyester-carbonates. Preferably halo-aryl carbonate end-capping substrates are used because of enhanced reactivity and efficacy.

Illustratively the transesterified polyester-carbonate end product derived from the process preferably exhibits an intrinsic viscosity of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl./g. Especially useful polyester-carbonates generally have an intrinsic viscosity within the range of from about 0.38 to about 0.85 dl./g. Preferably, the polyester-carbonates have a number average molecular weight of at least about 5,000, and more preferably from about 10,000 to about 50,000. Polyester-carbonates of such molecular weight characteristics process easily in between about 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

I claim:

1. A process for effecting a polyester-carbonate transesterification which comprises reacting a bis(ortho-haloaryl) ester of the formula

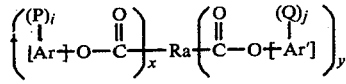

with a bis(ortho-haloaryl)carbonate and a dihydric phenol under transesterification reaction conditions where Ra represents an aromatic ring, both x and y individually represent whole numbers of at least 1 up to the maximum equivalent to the number of replaceable hydrogen atoms or other groups substituted for on an aromatic ring comprising Ra, independently at least a P or Q substituent is an ortho-positioned halogen or a trifluoromethyl group directly bonded to an aromatic ring carbon atom located adjacent to an oxy group of an ester group, at least one of i or j represents a whole number of at least 1 up to a maximum equivalent to the number of replaceable hydrogen atoms or other groups substituted for on aromatic rings comprising Ar and Ar'.

2. The claim 1 process where the dihydric phenol is of the formula:

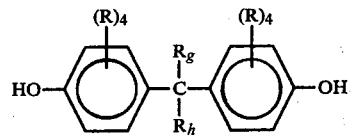

where independently each R is hydrogen, $C_{1-4}$ alkyl, methoxy, bromine or chlorine, $R_g$ and $R_h$ are hydrogen or a $C_{1-30}$ monovalent hydrocarbon or hydrocarbonoxy group, or of the formula:

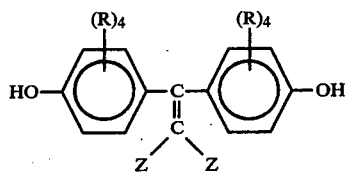

where independently each R is as defined previously and each Z is hydrogen, chlorine or bromine, subject to the proviso that at least one Z is chlorine or bromine.

3. The claim 1 process further comprising a metal hydride catalyst containing aluminum hydride and/or boronhydride.

4. The claim 1 process further comprising transesterification reaction conditions at temperatures less than about 300° C.

5. The claim 1 process where the ester is bis(orthohalophenyl)phthalate.

6. The claim 2 process where the dihydric phenol is bis(4-hydroxyphenyl)propane-2,2.

7. A polyester-carbonate transesterification process comprising reacting bis(orthohalophenyl)phthalate, bis(ortho-halophenyl)carbonate with bis(4-hydroxyphenyl)propane-2,2 under transesterification conditions.

* * * * *